United States Patent [19]

Yaniv

[11] Patent Number: 5,469,187
[45] Date of Patent: Nov. 21, 1995

[54] LARGE SCALE ELECTRONIC DISPLAY SYSTEM

[75] Inventor: Zvi Yaniv, Farmington Hills, Mich.

[73] Assignee: Advanced Technology Incubator, Inc., Farmington Hills, Mich.

[21] Appl. No.: 253,906

[22] Filed: Jun. 3, 1994

Related U.S. Application Data

[63] Continuation-in-part of Ser. No. 28,812, Mar. 10, 1993, abandoned.

[51] Int. Cl.$^6$ ........................................................ H04N 5/66
[52] U.S. Cl. .......................... 345/98; 340/815.65; 345/102
[58] Field of Search .......................... 340/815.65; 40/448, 40/449, 452, 444; 362/311, 360, 297; 359/53, 83; 345/87, 88, 102, 109

[56] References Cited

U.S. PATENT DOCUMENTS

| | | |
|---|---|---|
| 4,330,813 | 5/1982 | Deutsch . |
| 4,365,869 | 12/1982 | Hareng et al. . |
| 4,368,485 | 6/1983 | Midland . |
| 4,578,672 | 3/1986 | Dota et al. . |
| 4,622,881 | 11/1986 | Rand . |
| 4,723,119 | 2/1988 | Morimoto . |
| 4,807,978 | 2/1989 | Grinberg et al. . |
| 4,901,155 | 2/1990 | Hara et al. . |
| 5,005,950 | 4/1991 | Morin . |
| 5,075,993 | 12/1991 | Weinreich . |

*Primary Examiner*—Ulysses Weldon

[57] ABSTRACT

A large area liquid crystal display system in which all of the liquid crystal picture elements are relatively large sized and are disposed the correspondingly sized and shaped openings created between the adjacent rows and columns of a support structure. The support structure is formed of a plurality of vertical and horizontal, elongated triangular-shaped members. The triangular members are coated with a reflective material to enlarge the field of light emanating from each liquid crystal picture element. Control of light from the display is accomplished by a control lens such as a lenticular lens or a holographic lens, while control of incident light is achieved by venetian blind type materials.

21 Claims, 4 Drawing Sheets

LARGE SCALE ELECTRONIC DISPLAY SYSTEM

This application is a continuation-in-part of U.S. patent application Ser. No. 08/028,812, filed Mar. 10, 1993 in the name of ZVi Vaniv now abandoned.

FIELD OF THE INVENTION

This invention relates generally to the field of liquid crystal displays and more particularly to the field of large area liquid crystal display system wherein an image is formed on an array of large sized liquid crystal picture elements, or pixels, for viewing by a large group of people. Examples of large sized liquid displays include movie theater screens, projection television screens, marquis, or billboards. The invention most particularly relates to large size liquid crystal displays having first and second optical elements for coloring, guiding, and/or focusing light emanating from each picture element.

BACKGROUND OF THE INVENTION

In the general field of liquid crystal displays and particularly in the field of active matrix liquid crystal displays, major international electronics companies have, for the last decade, expended hundreds of millions of dollars for the development of "large area" high resolution displays. To date, these efforts have resulted in the development of high resolution displays in sizes approximating that of relatively small television sets. To attain high resolution in even two, three, or five inch diagonal liquid crystal television displays, the aforementioned electronics manufacturers have used thin film amorphous silicon transistors and diodes to function as the switching elements by which the discrete liquid crystal pixels in the display could be addressed. As the size of the display increases, the number of rows and columns of pixels correspondingly increases in order to maintain the requisite resolution. However, as the number of rows and columns of pixels increases, it became increasingly difficult to address each pixel at video speed rates.

To date, several individuals have attempted to solve the problem of making large scale, full color, video speed display devices. None appear to have succeeded. For example, U.S. Pat. No. 4,559,480 to Nobs for "COLOR MATRIX DISPLAY WITH DISCHARGE TUBE LIGHT EMITTING ELEMENTS" describes a matrix board display comprising a plurality of rows and columns of light emitting elements. Each light emitting element is a florescent light tube. This type of display would be effective for manufacturing, for example, sign boards. However, the invention described in the '480 patent is incapable of displaying information at anything approaching video speed rate. The inherent on-off time of florescent tubes is far below that necessary to drive a pixel at 60 cycles per second. In addition, the light elements disclosed by Nobs are considerably larger and thicker, and hence heavier than the elements used in the instant invention. Moreover, the discharge tube lights disclosed in the Nobs patent are also known to be relatively energy inefficient, to generate considerable amounts of heat, and not readable in direct sunlight. U.S. Pat. No. 4,635,150 to Favreau for "LARGE SCREEN VIDEO DISPLAY COMPRISING A MATRIX ARRAY OF CATHODE RAY TUBES OPERATED AT INCREASED VERTICAL AND HORIZONTAL SCAN RATES" discloses a device comprising a plurality of rows and columns of cathode ray tubes for displaying a large area image. The invention of Favreau recognizes the problems inherent in abutting a large number of display elements: namely, the appearance of a seam at the area of the adjacent displays. Favreau attempts to resolve this problem by using either a Fresnel lens or a fiberoptic face plate over each cathode ray tube in order to distort the image projected by that tube. In this way, Favreau tries to "hide" the seams around each display.

The problems inherent in the approach described in Favreau include the use of cathode ray tubes which are known to be exceedingly large, heavy, and great consumers of energy. Moreover, the face plate approach employed by Favreau is not completely successful in eliminating the presence of the seams around each CRT.

U.S. Pat. No. 4,791,417 to Bobak for "DISPLAY DEVICE" discloses the use of a plurality of nematic or smectic liquid crystal cells for producing a large size, two dimensional display panel capable of half-tone operation. While Bobak discloses the concept of a large scale liquid crystal display panel, there are a number inherent limitations in the approach described therein. For example, Bobak describes a reflective display. There is no back light. Therefore, viewing the image displayed thereon is dependent upon reflected ambient light. Obviously, such a display cannot be used in the dark. Further, the display elements employed by Bobak are incapable of displaying information at video rates of operation. This is because Bobak's display elements are not "active matrix" type liquid crystal displays. Since Bobak's device is not "active matrix" it has poor contrast ratio and a limited viewing angle. This type of display is also unable to operate at elevated temperatures. Moreover, Bobak does not recognize the presence of optical seams around each display. Accordingly, Bobak does not make accommodation for eliminating such seams.

BRIEF DESCRIPTION OF THE INVENTION

There is disclosed herein a large area liquid crystal display system, such as a billboard, movie theater screen, projection television screen, or the like, specifically adapted for public viewing by a large number of people. The display comprises a substantially rectangular support structure defining an X-Y matrix of substantially parallel rows and columns. The space between each two adjacent rows and each two adjacent columns defines an opening of a given shape. The shape of the openings may be any shape, such as, but not limited to square, rectangular, circular, hexagonal or triangular. Into each one of the openings, one of a plurality of discrete, large sized liquid crystal picture elements is operatively disposed. The shape of each picture element corresponds to the shape of the opening. Each of said picture elements presents a large image area to viewers of the information displayed thereupon. The picture elements should be sized to be large enough to be manipulable by installers or repairers of the display. Also, discrete, non-thin film switching elements are electrically connected to each picture element for simultaneously addressing each individual picture element housed in the rows and columns of the support structure. The switching elements may be any non-linear switching element, such as for example, transistors, diodes and M-I-M devices.

Each picture element is preferably of a rectangular shape and most particularly of a square shape. Regardless of the precise size and shape of the picture element, it must be sized and shaped to mate with the configuration and dimension of the opening of the support structure. Further, as opposed to cathode ray tubes, the depth dimension of the picture elements will be small relative to the length and width dimensions thereof. In one preferred embodiment, the picture elements have an image boundary of about one centimeter on a side; in a still more preferred embodiment, the picture elements have an image boundary of about ten centimeters or more on a side, though it is to be understood that any size picture element may be employed.

The support structure also includes a plurality of spaced, electrically conductive X address lines and a plurality of spaced electrically conductive Y address lines. In a preferred embodiment, the discrete switching elements are transistors which include first, second and third terminals. The first terminal of each of the transistors is electrically connected to an X address line, the second terminal of each of the transistors is electrically connected to a Y address line, and the third terminal of each of the transistors is electrically connected to a picture element associated with said X and Y address lines.

Each picture element may further include a picture element capacitor. The capacitor is a discrete capacitor having a capacitance at least more than two times, and preferably more than five times the inherent capacitance of the picture element. The discrete capacitor is provided to improve high temperature operations, and grey-scale performance.

The support structure may further be adapted to act as a light scattering element for dispersing light emanating from each liquid crystal picture element. In a preferred embodiment, the grid under the support structure takes the form of a three-dimensional grid wherein the depth dimension of each opening of the grid is substantially equal to the X and Y dimension of the support structure. The three-dimensional grid defines a plurality of boxes, each box open on the top and bottom. The interior of each box is coated with a light reflective material, such as aluminum, silver, or other commonly used reflective materials. In a preferred embodiment, the support structure is a three-dimensional support structure wherein the structure is a matrix having viewer proximal and viewer distal sides. The grid is fabricated of a plurality of elongated, generally triangular members. The triangular members may be isosceles triangular members, wherein the length of each equilateral arm is greater than the length of the base. The base of each triangular member is arranged on the viewer distal side of the grid. The grid defines a plurality of boxes arranged in an x and y matrix. The boxes are open on the front and back and are lined with a highly reflective material such as aluminum or silver. Like the picture element, the openings may be any shape. Disposed on the viewer distal side of the grid are the electronic switching elements, electrically conductive address lines and other electronic circuitry necessary to engage a single discrete liquid crystal picture element at each opening. Alternatively, the members may be three-sided members wherein a base is arranged on the viewer distal side, and symmetric parabolic sections are arranged on the viewer proximal side.

The three-dimensional support structure may be further adapted to engage and house a first optical element adapted to filter or split white light so as to provide light of various colors. For example, each opening defined by the three-dimensional support structure may be adapted to engage a prismatic lens which is capable of separating white light into red, green, and blue light. Alternatively, each opening may engage filter elements adapted to transmit a plurality of different colors. In another, equally preferred embodiment, each picture element could be adapted to display a plurality of colors, and the optical element disposed in each opening of the three-dimensional support structure could be a lens array adapted to focus light emanating from only a portion of the display onto a larger area, such as the area of an opening in the support structure.

For purposes of ease of connection and repair, each opening in the matrix of said support structure further includes means for receiving the first and the second terminals of said transistors and electrically connecting said first and second terminals to the X and Y address lines, respectively. Further, each of said discrete, large area picture elements includes means for receiving the third terminal of one of the discrete transistors and electrically connecting said third terminal to a first electrode of the picture element. The second picture element electrode is electrically connected to ground.

The purpose of the three-dimensional, reflective support structure is to eliminate the presence of optical artifacts caused by the interstitial region around each adjacent liquid crystal picture element. Specifically, the periphery of each picture element does not transmit light, as that space is reserved for electronic circuitry. Hence, each picture element is bounded by a darkened "seam". The three-dimensional grid is configured so that the size of the opening on the viewer distal side exactly corresponds to the light transmitting area of the liquid crystal picture element. The width of the three-dimensional grid is tapered from the viewer distal side to the viewer proximal side to present as narrow a seam as possible to the viewer. Light from the liquid crystal picture element is directed towards the viewer by reflective interior walls of the three-dimensional grid. Hence, the darkened interstitial region around each picture element is substantially eliminated. The large scale display may also include a light diffusing element operatively spaced between the grid and the viewer to eliminate any remaining optical artifacts.

Either each of the openings in the support structure or each of the switching elements will include pin connectors and the other of each of the openings in the support structure or each of the switching elements will include socket connectors, whereby the socket connectors are adapted to receive the pin connectors in electrical engagement. Both the picture elements and the switching elements are sized to be manually affixed and electrically interconnected within the openings in the support structure.

BRIEF DESCRIPTION OF THE DRAWINGS

FIG. 2b is a cross-sectional side view of the three-dimensional support structure taken along line A—A of FIG. 2a;

FIG. 2c is a cross-sectional side view of the three-dimensional support structure take along line B—B of FIG. 2a;

DESCRIPTION OF THE PREFERRED EMBODIMENTS

Disclosed as part of the instant invention is an improved large scale electronic display assembly, such as in liquid crystal displays and most specifically, by way of example and not by way of limitation to an active matrix liquid crystal display system. It is to be specifically noted that while an active matrix liquid crystal display system will be described in detail hereinafter as a preferred embodiment, the instant invention can be used with equal advantage in any type of backlit electronic display known to routineers in the art. Therefore, the improved large scale electronic display described herein is adapted to improve the overall viewability of a large area system, regardless of the type of display medium employed. With the foregoing objectives clearly in mind, the improved assembly can now be described in greater detail.

Figure 1:
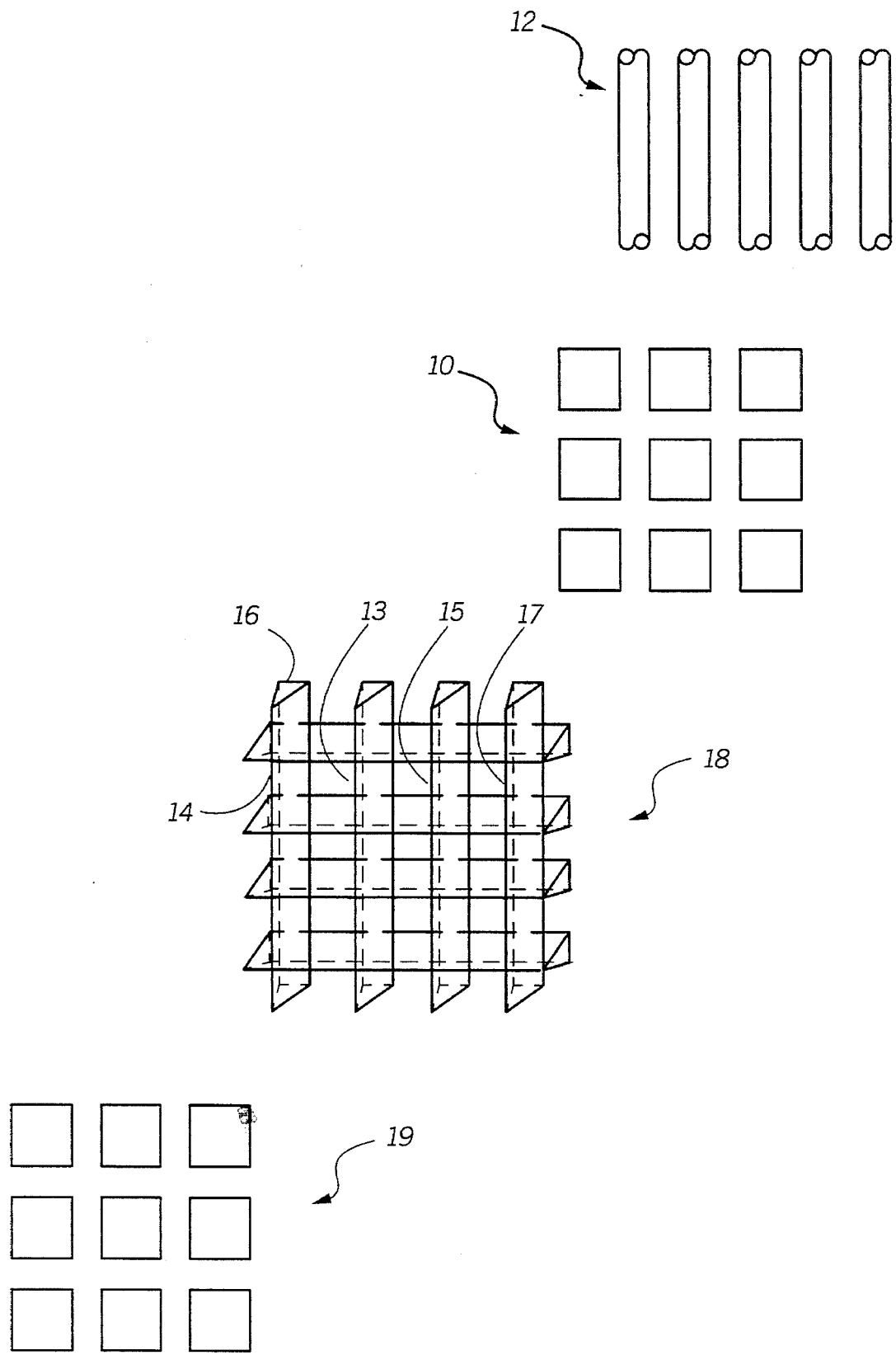
FIG. 1 is an exploded side view, in perspective, of the large area liquid crystal display of the instant invention.

Referring now to FIG. 1, there is depicted therein an exploded perspective illustration of the basic elements employed in the instant display system. Specifically, the large scale electronic display system of the instant invention includes an array of large scale liquid crystal picture elements. As illustrated herein, the array of picture elements includes an array 10 of nine liquid crystal picture elements arranged in a 3-by-3 matrix. It is to be understood that any number of elements may be used, arranged in any manner. Moreover, the picture elements, while illustrated as rectangular, may be any shape such as, for example, square, rectangular, circular or hexagonal. The array of picture elements 10 will be described in greater detail hereinbelow with respect to FIG. 3.

Disposed immediately behind the liquid crystal array 10 is a light source 12, illustrated in FIG. 1 as a plurality of elongated tubes. The light source may be either a point source light such as a single light bulb or a fluorescent tube. Alternatively, the light source may be a plurality of light sources, such as a plurality of fluorescent tubes. A fluorescent tube light source will typically be driven by conventional or electronic ballasts (not shown). The light source may be a white light source or may be adapted to project a specific wavelength of light in the visible or near visible, i.e., ultraviolet or infrared spectrum. Though not illustrated, the light source 12 may also include a back reflector housing adapted to redirect light initially traveling away from the picture element array 10.

Disposed on the side of the picture element array 10 opposite light source 12 is a three-dimensional grid structure 18 having a viewer proximal 14 and viewer distal 16 side. Grid structure 18 is a X-Y-Z matrix fabricated of a plurality of triangular shaped, elongated members. Each triangular shaped member is an isosceles triangular shaped member wherein the length of the base is less than the length of the two equal sides. Alternatively, the elongated members may be three-sided members having a base arranged on the viewer distal side, and equal, symmetric, parabolic sections arranged on the viewer distal side.

The plurality of isosceles triangular shaped elongated members are arranged so that the base of each triangular member faces the same direction and forms the viewer distal side 16 of the structure 18. The point of the triangular members created by the intersection of the equal length sides are arranged on the same side and create the viewer proximal side 14 of the grid structure 18.

The grid structure 18 defines a number of openings, for example, 13, 15, 17. The number of openings in the grid structure is adapted to correspond to the number of liquid crystal picture elements which make up the large scale electronic display. The size and shape of each opening corresponds to the shape of the picture elements to be employed. As will be described in greater detail hereinbelow with respect to FIG. 2, each of the elongated triangular members are coated with a highly reflective material. Examples of preferred highly reflective materials include aluminum, silver, and combinations thereof.

Also disposed in each opening 13–15–17 of grid structure 18 is an optical element 19 of FIG. 1. Said optical elements may be adapted to split light emanating from the light source into its constituent parts. For example, if light source 12 is adapted to provide white light, optical element 19 may be adapted to split white light into blue, red, or green light. Alternatively, optical element 19 may be a filter element adapted to color white light into one or more different colors. In another embodiment, optical element 19 may be adapted to focus and/or guide light emanating from a portion of each picture element onto a larger area and project said light to the viewer. Hence, in a preferred embodiment, each liquid crystal picture element 10 is adapted to project red, green, and blue light. Optical element 19 is then adapted to focus and/or guide light emanating from each portion of liquid crystal element 10 onto a larger area.

In the embodiment in which the display is adapted to project colored light, the optical elements 19 may be stripes of color filters. The width of the color stripes can be used to balance the light output of each color source within a cell. The optimum color strip widths, starting from one edge, are W/4, W/2, and W/4 for the three primary colors, where w is width. Accordingly, the segments would be ¼, ½, and ¼ of the total width of the elements. The reason for this selection of widths is that the reflective sides of the triangular members reflect light incident upon them and form images of the stripes in reverse order. Hence, if the color pattern from left to right is red, green and blue, then the first reflection to the right will be blue followed by green and red, while to the left the reflections will be red, green and blue. By making the end colors one-half the width of the center color strip, all three color stripes will appear to be of equal width.

Figure 2A:
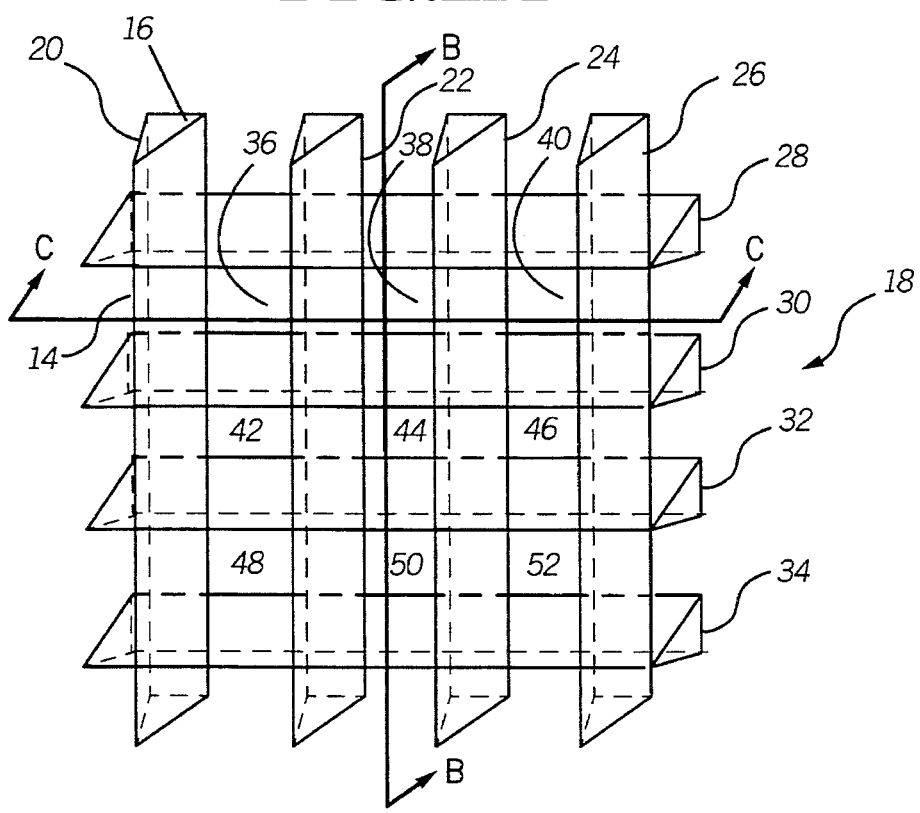
FIG. 2a is a front perspective view of the three-dimensional support structure of the instant invention.

Referring now to FIG. 2a–2d, there is illustrated therein a front perspective, cross-sectional and rear plan view of the three-dimensional grid structure 18 of FIG. 1. More particularly, and with reference to FIG. 2a, there is illustrated therein a perspective front view of the three-dimensional grid structure 18 having viewer proximal 14 and viewer distal 16 sides. The grid structure 18 includes four vertical members 20, 22, 24, and 26, and four horizontal members 28, 30, 32, and 34. Members 20–34 create a number of crossover points, each crossover point defining an opening 36, 38, 40, 42, 44, 46, 48, 50, 52. The opening between each two adjacent vertical and horizontal members defines an opening of a given shape. Into each one of the openings 36, 38, 40, 42, 44, 46, 48, 50, 52, one of a plurality of discrete, large size liquid crystal picture elements is operatively disposed. The shape of each picture element corresponds to the shape of the opening. It is to be noted that while FIG. 2a illustrates grid structure 18 as having nine openings, formed of four vertical and four horizontal members, any number of any sized and shaped openings may be employed by changing the number or spacing of vertical and horizontal members. Moreover, while support structure 18 is generally configured in a planar shape, it is to be understood that structure 18 can be bent or formed into any shape such as, by way of example and not limitation, a cube, a cylinder, or a sphere.

Better mixing of light is achieved as the length of the openings is increased. Greater length causes loss of light, however, since as the length is increased, light is reflected more times between the walls of the triangular members before it exits and losses occur at each reflection. Thus, the maximum length of a cell is limited by light losses and minimum length by visibility of color components. The best height-to-width ratio for the cell may be 1.5, plus or minus 20%. That is, the length of the cell should be approximately 1.5 times the width of the cell at the output plane. This ratio can be greater but some loss of output brightness will occur.

Each of the elongated triangular members is an elongated isosceles triangular member wherein the base of the isosceles triangle is shorter than the equilateral arms. Each base of each member is arranged towards the viewer distal side 16 of the support structure 18, as illustrated in FIG. 2d. The point of the isosceles triangle created by the intersection of the equilateral arms is arranged towards the viewer proximal 14 side of the support structure 18. Each elongated isosceles triangular member may be fabricated from any of a number of known materials including, for example, plastic, glass, light weight metallic material, or polymeric material. The elongated triangular shaped members are further coated with a highly reflective material, such as aluminum, silver, or combinations thereof. The reflective material may further include diffusing irregularities so as contribute to better color mixing in full color display applications. In a preferred embodiment of the instant invention, each elongated triangular shaped member is an elongated isosceles triangular shaped member fabricated of plastic and coated with aluminum.

As will be discussed in greater detail hereinbelow with respect to FIG. 3, each liquid crystal picture element requires peripherally mounted electronic circuitry in order to function. The viewer distal side of support structure 18 may be further adapted to house said electronic circuitry, or otherwise mount said electronic circuitry thereon. Accordingly, electronic circuitry will be hidden from a viewer operatively disposed on the viewer proximal side of support structure 18.

Moreover, and more importantly, the purpose of reflective, three dimensional support structure 18 is to eliminate the presence of optical inclusions and optical artifacts occasioned by the "optical seam" created when large scale liquid crystal picture elements are placed in adjacent relationship, in a process known as "tiling". As noted hereinabove, liquid crystal picture elements require the presence of peripherally mounted drive circuitry. Were one to place two or more liquid crystal picture elements immediately adjacent each other, they would not project a continuous image, as the image would be broken by the presence of the electronic circuitry. Conversely, by mounting the electronic circuitry on the viewer distal side of the support structure 18, and using the highly reflective support structure having the narrowed viewer proximal side, the present of "optical seams" and other optical artifacts is eliminated. It is accordingly possible to present a large scale continuous image to a remotely positioned viewer without the presence of optical artifacts.

Figure 2B:
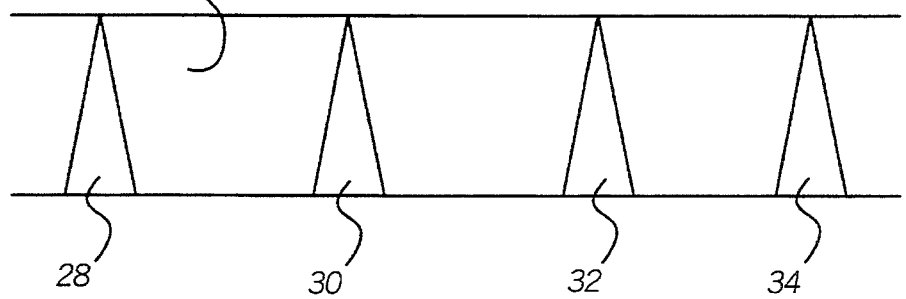
Figure 2C:
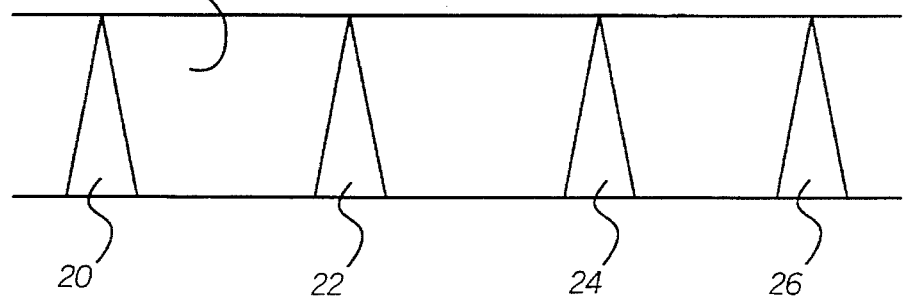
Figure 2D:
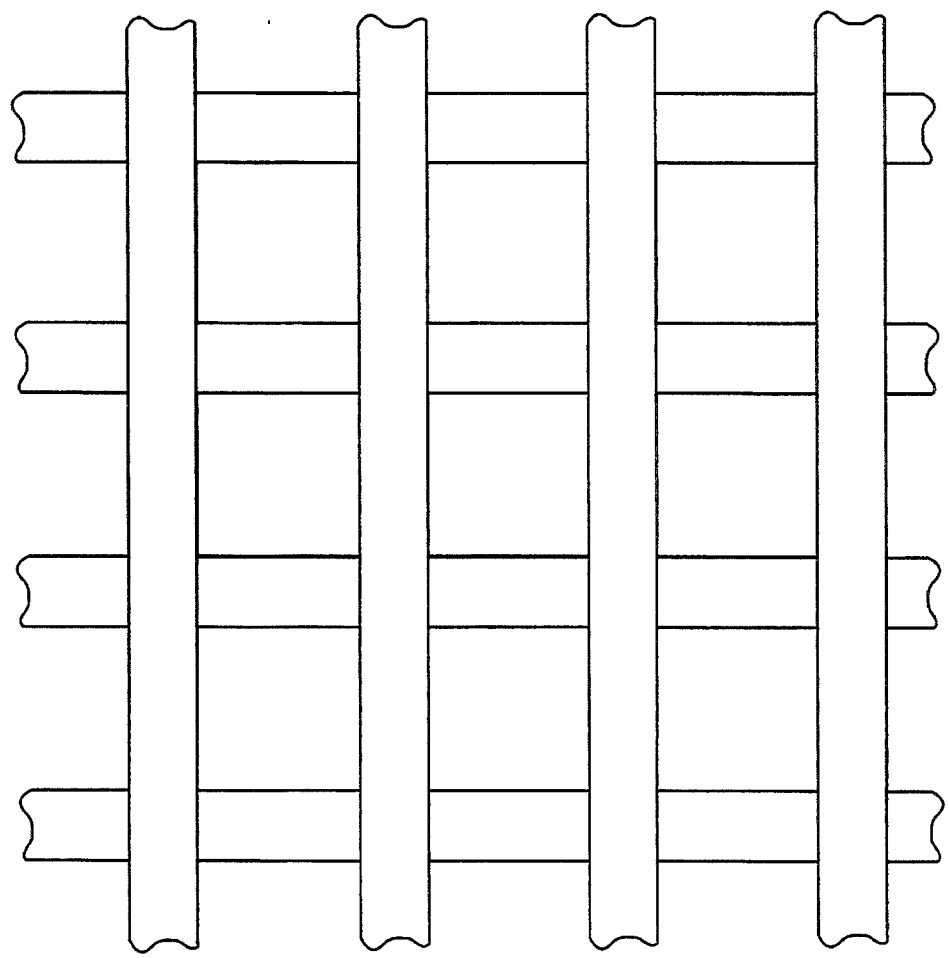
FIG. 2d is a rear plan view of the three-dimensional support structure.

Referring now to FIGS. 2b and 2c, there is illustrated therein cross-sectional side views of support structure 18 taken along lines B—B and C—C respectively. As may be appreciated from FIG. 2b, there is illustrated therein a cross-sectional side view of members 28, 30, 32, and 34 as well as an elongated view of member 22. Conversely, FIG. 2c illustrates cross-sections of member 20, 22, 24, and 26, and a full view of member 30.

Figure 3:
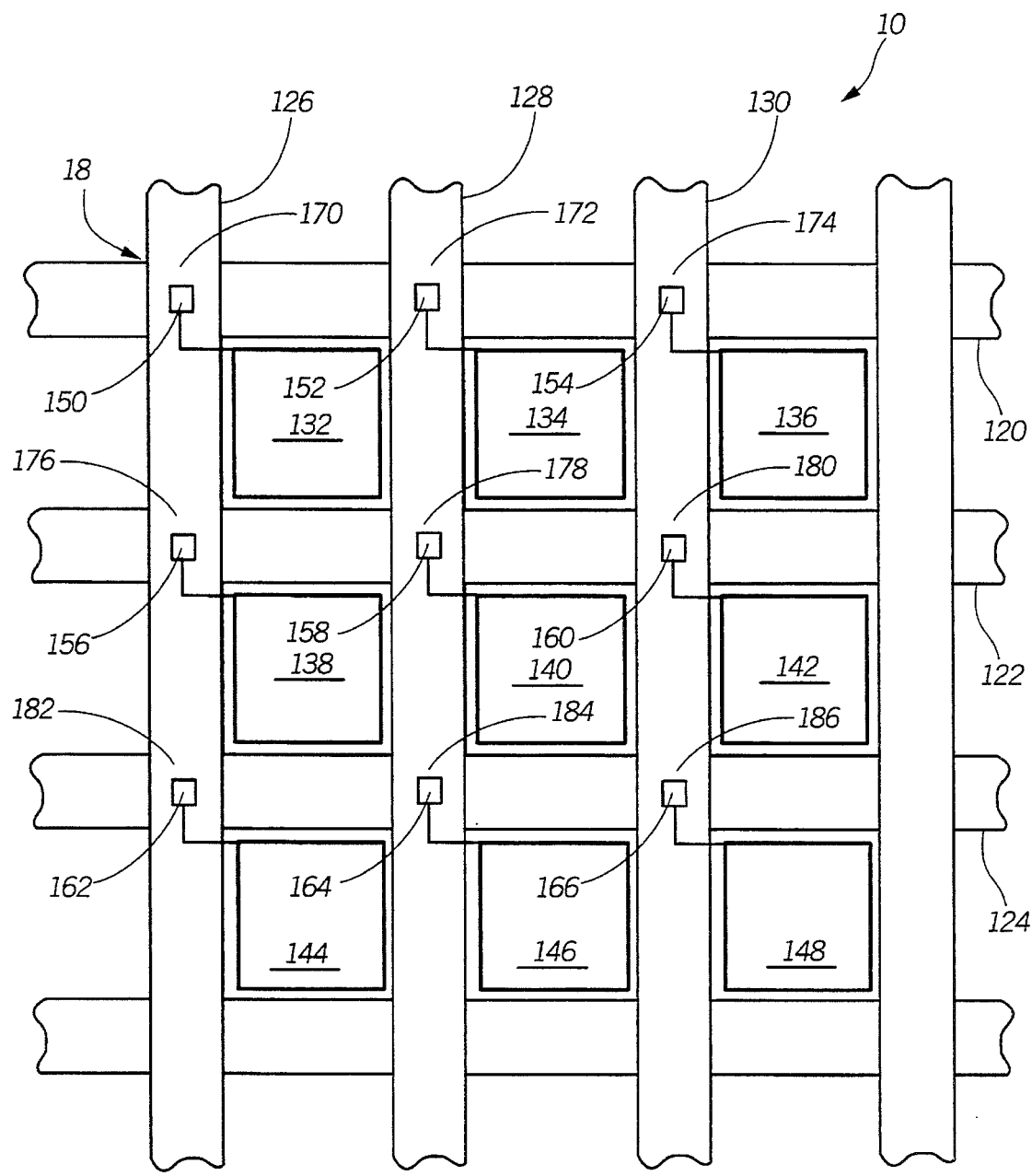
FIG. 3 is a front plan view illustrating the large area liquid crystal display defined by a matrix array of large sized picture elements and switching elements operatively disposed on the viewer distal side of the support structure.

FIG. 3 generally illustrates, by the reference numeral 10, the large area array liquid crystal picture elements illustrated in FIG. 1, disposed on the viewer distal side 16 of support structure 18 of FIG. 2. It is to be understood that the large area liquid crystal display system of the instant invention may be either black-and-white or full color, and is adapted to generate either still or video images for a mass audience positioned remotely therefrom. The display system 10 includes a large area, substantially rectangular support structure 18, defining therewithin a first set of X address lines including address lines 120, 122 and 124, mounted on the viewer distal side 16 of support structure 18 of FIG. 2. A second set of Y address lines including address lines 126, 128 and 130, and a plurality of large scale discrete liquid crystal picture elements 132, 134, 136, 138, 140, 142, 144, 146 and 148. The system 10 further includes a switching element 150, 152, 154, 156, 158, 160, 162, 164 and 166 operatively associated with each large scale, discrete liquid crystal picture element.

As can be noted in FIG. 3, the X address lines 120, 122 and 124 and the Y address lines 126, 128, and 130 cross at an angle, defining an X-Y matrix of substantially parallel rows and columns, and are spaced from one another to form a plurality of crossover points 170, 172, 174, 176, 178, 180, 182, 184 and 186. The X and Y address lines are each adapted to transmit separate, independent electrical impulses, supplied by off-board electronic drivers (not shown), to each of the large scale, discrete liquid crystal picture elements. Hence, while said X address lines and said Y address lines do cross at angles, it is important to understand that said X address lines 120–124 are electrically insulated from the crossing Y address lines 126–130.

Associated with each of the crossover points 170–186 is a respective one of the large scale, discrete liquid crystal picture elements 132–148. The liquid crystal picture elements 132–148 are individually attached to the support structure 18 and are uniformly distributed thereover in spaced apart relation to minimize the interstitial spaces therebetween. In this way it is possible to provide a large area, substantially continuous either still or video image unimpeded by spaces between the liquid crystal picture elements 132–148 occasioned by, for example, the grid pattern of the X and Y address lines, or the support structure 18 itself. Note that while three rows and the three columns of picture elements have been illustrated in FIG. 3, any number of rows and columns of large scale picture elements may be employed without departing from the spirit or scope of the instant invention. Further, note that while FIG. 3 has been illustrated having substantially square shaped picture elements, the shape of the picture elements need not be so limited. Other shapes, such as rectangular, hexagonal, or triangular may also be employed. The structure may also be bent into three dimensions so as to form, for example, a sphere, a cylinder or a cube.

As alluded to hereinabove the large scale liquid crystal picture elements 132–148 are preferably rectangular in shape, and more particularly, square in shape. Regardless of the precise size and shape of the macroscopically sized, discrete liquid crystal picture elements it is important that the picture element and the openings defined by the X-Y matrix of row and columns on the support structure 18 cooperate so that the large area picture elements completely fill the open area. Thus, the opening defined between adjacent rows and columns must completely accommodate both the length and width dimension of each large area picture element while minimizing the interstitial spaces between each adjacent large area picture element.

The large scale discrete liquid crystal picture elements 132–148 are further of the type which have a depth dimension which is relatively small as compared to the length and width dimensions described hereinabove. In the preferred embodiment, the image boundary of the discrete liquid crystal picture elements 132–148 is about 50 centimeters or more on a side. This length and width dimension is to be compared with the depth dimension of about 5 centimeters or less, and in a preferred embodiment, about 1 centimeter or less. This thin, substantially flat, profile is accomplished by employing picture elements having liquid crystal material housed within and operatively disposed between two substantially parallel picture element electrodes, which electrodes themselves are deposited upon opposing transparent substrate formed of, for example, thin sheets of high quality glass. The opposing transparent glass substrate should also be light-weight, but mechanically sturdy, so as to provide structural rigidity, thus preventing breakage and allowing for easy manipulation by installers or repairers servicing the large area display.

Each of the discrete liquid crystal picture elements 132–148 further includes a switching element 150–166 operatively associated therewith, which switching element may be affixed or affixable to one of said transparent substrate, preferably on the side thereof opposite the picture element electrode and in electrical communication with said picture element electrode. Regardless of whether the switching element is mechanically affixed to the picture elements, in a preferred embodiment, the switching elements 150–166 must be placed in electrical communication with one of the electrodes thereof. It is preferred that one terminal of said switching element electrically communicate with the picture element electrode disposed on the transparent substrate most distant from the viewer. By so electrically disposing the contact, the switching element is invisible on the viewer proximal side of system 10.

The switching elements 150–166 are adapted not to conduct electrical impulses below a certain preselected threshold voltage. Thus, the switching elements are adapted to prevent stray electrical impulses and electronic "noise" transmitted through the X-Y address lines of the matrix from prematurely or inadvertently activating the discrete picture element associated therewith. The switching elements 150–166 may be either discrete, large area devices manually mounted, as by plug and socket connection, to each large area picture element, or said elements may be thin film devices deposited directly onto the glass substrate of each large area picture element.

Each picture element may further include a picture element capacitor. The capacitor is a discrete capacitor having a capacitance at least more than two times, and preferably more than five times the inherent capacitance of the picture element. The discrete capacitor is provided to improve high temperature operations, and grey-scale performance.

In one preferred embodiment, the switching element includes a pair of discrete diodes operatively disposed in anode-to-cathode relationship so as to function as a two-diode, three terminal switch which is electrically connected and mechanically affixed to an electrode of said large area picture element. In a second and more preferred embodiment, the switching element employed in conjunction with and in order to address each large area picture element in the X-Y matrix of the display 10 is a discrete transistor. Since the transistor is a three terminal device, it is adapted to electrically communicate with both the X and Y address lines, as well as with one electrode of each large area picture element. Each second picture element electrode in a given row or column is connected to a common lead.

Figure 4:
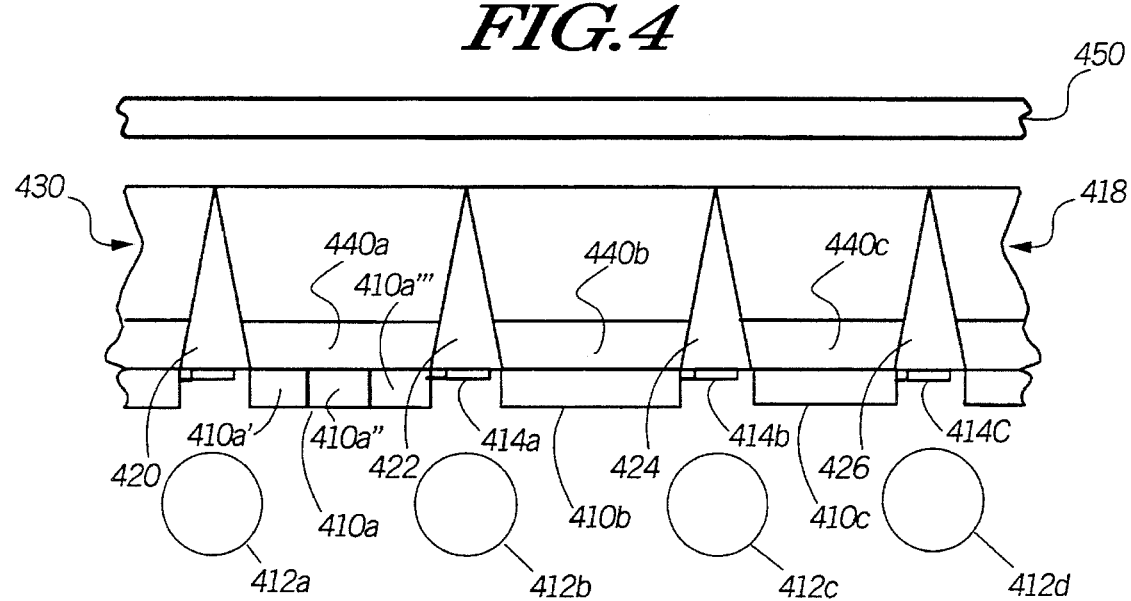
FIG. 4 is a cross-sectional side view of three picture elements of the instant invention.

Referring now to FIG. 4, illustrated therein is a cross-sectional side view of three picture elements of the instant invention. Specifically, there is illustrated three elements 410*a*, 410*b*, and 410*c* having light sources 412*a*, 412*b*, 412*c*, and 412*d* disposed on one side thereof. Each picture element 410*a*–410*c* is in electrical communication with peripherally mounted electronic circuitry 414*a*, 414*b*, 414*c*. This circuitry can take the form of, for example, two or three terminal electronic devices, such as diodes, diode rings, back-to-back diodes, thin film transistors, field effect transistors, capacitors, and combinations of the foregoing. Other electronic devices may also be applied advantageously without departing from the spirit or scope of the instant invention. It is further contemplated that the electronic circuitry 414*a*, 414*b*, and 414*c* will include at least the switching elements 150–166 illustrated in FIG. 3. Each picture element 410*a*–410*c* is mounted in the opening created by two adjacent vertical and two adjacent horizontal elongated triangular members. For purposes of FIG. 4, liquid crystal picture element 410*a* is operatively disposed between vertical members 420 and 422, and horizontal members 430 and 432 (not shown). Liquid crystal picture element 410*b* is operatively disposed between vertical members 422 and 424, and horizontal members 430 and 432 (not shown). Liquid crystal picture element 410*c* is operatively disposed between vertical members 424 and 426, and horizontal members 430 and 432 (not shown).

Disposed on the base of viewer distal side of vertical members 420, 422, 424,426 is electronic circuitry 414*a*, 414*b*, and 414*c* as well as X and Y address lines as described above with respect to FIG. 3. Accordingly, a remotely positioned viewer will not see the optical seam created by peripherally mounted electronic circuitry disposed between each adjacent liquid crystal picture element. Moreover, the gap between each element is eliminated by vertical and horizontal members coated with a highly reflective material. This is due to the fact that light emanating from each liquid crystal element will be spread out so as to obscure the gaps between each adjacent element.

The display system may further include a directional dependant light diffusing element operatively disposed on the viewer distal side of the support structure. The function of such a diffuser would be to limit the angular width of incoming light, without excessive light losses. Accordingly, contrast ratio may be considerably improved.

The large scale display system may further include a control optical element 450 operatively disposed between the viewer and the support structure 418. The control optical element 450 is adapted to at least eliminate any remaining optical artifacts which may be created by the support structure 418. The light diffusing member 450 may consist of one or more elements adapted to achieve the desired degree of light diffusion. The control optical element may also serve other functions, such as, but not limited to imparting color passing therthrough. These other function will be discussed in greater detail hereinbelow.

The expected viewing zone of a large scale display system contemplated by the instant invention is wide horizontally but rather narrow vertically. A displayed image would appear brighter if the light were emitted only in those directions where the viewers are located. Different horizontal and vertical spreads would be preferable to those having equal dispersion horizontally and vertically. The control optical element 450 may be employed to peform such a function.

At least four types of diffusing members are available for mixing the light: Opal glass, roughed surface diffusers, lenticular screens, and holographic diffusers. Besides color mixing, retroreflection of light is also an important consideration, as retroreflection reduces image contrast in bright ambient light conditions.

Roughed surface type diffusers are most common and are typically used for projection screens. A wide variety of such screens are available and several were tested. The best was judged to be a back-projection screen sold by Edmund Scientific, (catalog number P70,047). This screen provides adequate color mixing with the 1.5 length-to-width ratio, and the back scatter is considerably lower than other similar screens. Reduction in back-scatter is achieved, in part, by making the glass slightly absorbing. The ambient backscattered light is attenuated twice as the light enters and then exits the screen on the same side, while transmitted light passes through it only once. Thus, a net gain in contrast is achieved. This diffuser has equal horizontal and vertical light spread.

Independent control over the vertical and horizontal spread of light is desirable and can be achieved using one-dimensional diffusers. A cylindrical lenticular screen, consisting of closely spaced, narrow width long cylindrical lenses, is an excellent one-dimensional diffuser. The f-number of the lenses determines the spread of light, and the spread is only in one direction. By proper selection of the f-numbers of the lenses, the desired scattering angle for vertical and horizontal directions can be achieved that are independent of each other. A pair of such screen positioned orthogonally to each other can achieve the desired result. A lenticular screen having an f-number of 0.7 horizontally would disperse light over a 90 degree angle, while a f-number of 3 in the vertical direction would provide a 20 degree field of view. These fields of view would be ideal in many applications of the electronic billboard. An additional advantage of lenticular type screens is that the back scatter of ambient light is much lower than that of typical roughed surface diffuse screens.

Alternatively, holographic diffusers have unique and desirable properties: they can be made to have any combination of vertical and horizontal scattering angles, their backscatter level is low, and they can be made directional, affecting light over a limited angle. Accordingly, one can use a single holographic diffuser in place of two non-holographic diffusers.

Alternatively, the control optical element may be one or more liquid crystal light valves, such as polymer dispersed liquid cyrstal light valves.

The control optical ement 450 may thus be fabricated as anyone of the foregoing optical elements, depending on the desired use of the large scale liquid crystal display device. It is also to be understood that while the control optical element is illustrated as a single element, two or more sub-elements, as described above, may be employed to achieve a desired effect. Accordingly, for example, two or more lenticular lens arrays may be disposed as a single control optical element to control light difusion in both the horizontal and vertical directions.

A second sub-element may be adapted to be a directional dependent light diffusing element. The purpose of such an element would be to control the direction of light striking and emanating from the display. The purpose of such an element would be to improve contrast ration, while minimizing light loss from a light source. Elements that may be employed in such a configuration include, for example, light films, mechanical shutters, lenses, or mechanical devices known in the art as "venetian blinds".

The electronic display device illustrated in FIG. 4 may further include optical elements 440a, 440b, and 440c disposed within each opening of support grid 418 immediately atop each liquid crystal element 410a, 410b, 410c. Each optical element 440a–440c may be adapted to perform one of a number of functions. For example, optical elements 440a–440c may be adapted to split white light emanating from light sources 412a–412d into their various constituent colors, for example, red, green, or blue. Alternatively, optical elements 440a–440c may be color filter elements adapted to color white light emanating from light sources 412a–412d into any one of a number of colors, again, for example, red, green, or blue. In yet another preferred embodiment, each liquid crystal element 410a–410c is divided into three sub-elements, for example, 410a', 410a", 410a'''. Each sub-element is adapted to project a different color light. For example, 410a' may be adapted to project red light, 410a" blue light, and 410a''' green light. In this embodiment, optical element 440a is adapted to spread light projected by each sub-element and focus it onto an area at least as wide as the opening between adjacent vertical members 420–422 and adjacent horizontal members 430–432.

As may be readily appreciated by those skilled in the art, the present invention can be practiced other than as is specifically disclosed herein. Thus, while the instant invention has been described with respect to certain preferred embodiments thereof, it is to be understood that the foregoing and other modifications and variations may be made without departing from the spirit or scope thereof.

I claim:

1. A large area liquid crystal display comprising:

a substantially rectangular support structure adapted for viewing by a plurality of viewers, and having a viewer proximal and a viewer distal side, said structure comprised of a plurality of elongated triangular members, coated with a reflective material, and arranged horizontally and vertically so as to define an X-Y matrix of substantially parallel rows and columns, the space between each two adjacent horizontal and each two adjacent vertical triangular members defining an opening, and each said opening having a length dimension greater that the width dimension;

discrete liquid crystal picture elements, each liquid crystal picture element adapted to present a large image area to viewers of the information displayed thereupon;

a liquid crystal picture element being operatively disposed in each one of the openings in the X-Y matrix of said support structure;

discrete, electronic switching elements electrically connected to the liquid crystal picture elements for simultaneously addressing specific elements in the rows and columns of the matrix; and a control optical element operatively disposed adjacent to the viewer proximal side of the support structure, said control optical element comprising a holographic diffuser, and is adapted to control diffusion in both the horizontal and vertical direction.

2. A display system as in claim 1, wherein the ratio of the length dimension to the width dimension of each opening is between 1.2 and 1.8, and preferably about 1.5.

3. A display system as in claim 1, further including a plurality of first optical elements, one optical element being disposed in each opening of said support structure, and operatively associated with the liquid crystal picture element disposed in said opening, said optical elements adapted to color light emanating from a light source disposed on the viewer distal side of said support structure in order to obtain one multicolor pixel on the viewer proximal side of the display.

4. A display system as in claim 1, wherein said liquid crystal picture elements are subdivided into at least three segments, each said segment adapted to project a different color.

5. A display system as in claim 4, wherein the liquid crystal picture elements are divided into first, second, and third segments, and wherein the ratio of the widths of the first, second, and third segments are ¼, ½, and ¼ respectively.

6. A display system as in claim 5, wherein said first and third segments are adjacent to said elongated triangular members.

7. A display system as in claim 1, wherein said triangular members coated with a reflective material further include diffusing irregularities to enhance color properties.

8. A display system as in claim 4, wherein said control optical element comprises fabricating said display with a length to width ration for said openings of approximately 1.5, and wherein the ratio of the widths of the first, second, and third segments are ¼, ½, and ¼ respectively, and wherein said triangular members coated with a reflective material further include diffusing irregularities to enhance color properties so as to provide uniform color diffusion without lens means.

9. A display system as in claim 1, wherein said display is adapted to provide a large area image substantially free of seams or unsymetrical lines caused by said support structure.

10. A display system as in claim 1, further including a directional dependent light diffusing element operatively disposed on the viewer distal side of the support structure.

11. A display system as in claim 7, wherein said directional dependent light diffuser is adapted to improve contrast ratio, while limiting angular widths of illuminating light without creating lighting losses.

12. A display system as in claim 1, further including means for controlling light incident on the viewer proximal side of the display.

13. A display system as in claim 1, wherein each elongated triangular member is an elongated isosceles triangular member, wherein the length of each equilateral side of said triangle is greater than the length of the base of said triangle.

14. A display system as in claim 13, wherein the base of each elongated triangular member is arranged towards the viewer distal side of said support structure.

15. A display system as in claim 12, further including a plurality of spaced, electrically conductive X address lines and a plurality of spaced, electrically conductive Y address lines, each X and Y address line in electrical communication with at least one liquid crystal picture element.

16. A display system as in claim 13, wherein the discrete switching elements are selected from the group of elements consisting of diodes, M-I-M devices, transistors, zener diodes, varistors, and combinations thereof.

17. A display system as in claim 16, wherein of said support structure is further adapted to house said X and Y address lines and said discrete switching elements on the viewer distal side thereof.

18. A display system as in claim 1, wherein the size of each liquid crystal picture element is substantially the same as the size of the opening in the matrix of the support structure.

19. A display system as in claim 1, wherein the picture elements and the switching elements are sized and configured to be electrically interconnected within the opening in said support structure.

20. A large area liquid crystal display comprising:

a substantially rectangular support structure adapted for viewing by a plurality of viewers, and having a viewer proximal and a viewer distal side, said structure comprised of a plurality of elongated triangular members, coated with a reflective material, and arranged horizontally and vertically so as to define an X-Y matrix of substantially parallel rows and columns, the space between each two adjacent horizontal and each two adjacent vertical triangular members defining an opening, and each said opening having a length dimension greater that the width dimension;

discrete liquid crystal picture elements, each liquid crystal picture element adapted to present a large image area to viewers of the information displayed thereupon;

a liquid crystal picture element being operatively disposed in each one of the openings in the X-Y matrix of said support structure;

discrete, electronic switching elements electrically connected to the liquid crystal picture elements for simultaneously addressing specific elements in the rows and columns of the matrix; and a control optical element operatively disposed adjacent to the viewer proximal side of the support structure, said control optical element comprising a first and second lenticular lens, said lenses disposed orthogonally to one another.

21. A large area liquid crystal display comprising:

a substantially rectangular support structure adapted for viewing by a plurality of viewers, and having a viewer proximal and a viewer distal side, said structure comprised of a plurality of elongated triangular members, coated with a reflective material, and arranged horizontally and vertically so as to define an X-Y matrix of substantially parallel rows and columns, the space between each two adjacent horizontal and each two adjacent vertical triangular members defining an opening, and each said opening having a length dimension greater that the width dimension;

discrete liquid crystal picture elements, each liquid crystal picture element adapted to present a large image area to viewers of the information displayed thereupon;

a liquid crystal picture element being operatively disposed in each one of the openings in the X-Y matrix of said support structure;

discrete, electronic switching elements electrically connected to the liquid crystal picture elements for simultaneously addressing specific elements in the rows and columns of the matrix; and a control optical element operatively disposed adjacent to the viewer proximal side of the support structure, said control optical element comprising a polymer disperse liquid crystal sheet.

\* \* \* \* \*